(12) United States Patent
Mendes et al.

(10) Patent No.: US 9,798,515 B1
(45) Date of Patent: Oct. 24, 2017

(54) CLOCK SYNCHRONIZATION FOR AUDIO PLAYBACK DEVICES

(71) Applicant: Bose Corporation, Framingham, MA (US)

(72) Inventors: Paulo Souza Mendes, Hopkinton, MA (US); Michael William Elliot, Grafton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/087,021

(22) Filed: Mar. 31, 2016

(51) Int. Cl.
| | |
|---|---|
| *H04B 5/00* | (2006.01) |
| *G06F 3/16* | (2006.01) |
| *H04L 12/18* | (2006.01) |
| *H04L 7/04* | (2006.01) |
| *H04J 3/06* | (2006.01) |

(52) U.S. Cl.
CPC ............. *G06F 3/165* (2013.01); *H04L 7/04* (2013.01); *H04L 12/18* (2013.01); *H04J 3/0635* (2013.01); *H04J 3/0664* (2013.01); *H04J 3/0667* (2013.01)

(58) Field of Classification Search
CPC .......... G06F 3/165; H04L 7/04; H04L 12/118; H04L 12/18; H04J 3/0664; H04J 3/0667; H04J 3/0635
USPC ..................................................... 381/77, 79
See application file for complete search history.

(56) References Cited

U.S. PATENT DOCUMENTS

| | | | |
|---|---|---|---|
| 5,087,980 A | 2/1992 | Staffer | |
| 5,530,859 A | 6/1996 | Tobias, II et al. | |
| 5,655,144 A | 8/1997 | Milne et al. | |
| 5,951,690 A | 9/1999 | Baron et al. | |
| 5,987,106 A | 11/1999 | Kitamura | |
| 6,134,379 A | 10/2000 | LaMacchia | |
| 6,285,405 B1 | 9/2001 | Binford, Jr. et al. | |

(Continued)

FOREIGN PATENT DOCUMENTS

| | | |
|---|---|---|
| WO | 96/01540 A2 | 1/1996 |
| WO | 98/56135 A2 | 12/1998 |

(Continued)

OTHER PUBLICATIONS

Son, Sang H., & Agarwal, Nipun, "Synchronization of Temporal Constructs in Distributed Multimedia Systems with Controlled Accuracy", Department of Computer Science, University of Virginia, 0-8186-5530-5/94, IEEE, pp. 550-555.

*Primary Examiner* — Disler Paul

(57) ABSTRACT

A method is provided for synchronizing clocks on a plurality of audio playback devices. The method includes receiving a broadcast/multicast acknowledgement packet from a synchronization agent at a first audio playback device of the plurality of audio playback devices. A first timestamp representing a time when the acknowledgement packet was received by the first audio playback device is recorded. A broadcast/multicast timestamp packet is received from a time server at the first audio playback device. The timestamp packet includes a second timestamp representing a time when the time server received the acknowledgement packet from the synchronization agent. A local clock time on the first audio playback device is updated based on the first timestamp and the second timestamp. The method enables clock synchronization among the plurality of audio playback devices for synchronized playback of streamed audio via the plurality of audio playback devices.

19 Claims, 6 Drawing Sheets

(56) References Cited

U.S. PATENT DOCUMENTS

| | | |
|---|---|---|
| 6,631,410 B1 | 10/2003 | Kowalski et al. |
| 7,023,833 B1 | 4/2006 | Aiello et al. |
| 7,391,791 B2 | 6/2008 | Balassanian et al. |
| 7,483,538 B2 | 1/2009 | McCarty et al. |
| 7,539,889 B2 | 5/2009 | Celinski et al. |
| 7,643,894 B2 | 1/2010 | Braithwaite et al. |
| 7,917,082 B2 | 3/2011 | Goldberg et al. |
| 7,996,700 B2 | 8/2011 | Celinski et al. |
| 8,234,395 B2 * | 7/2012 | Millington ............ H04J 3/0664 709/205 |
| 8,238,376 B2 | 8/2012 | Iwamura |
| 8,588,949 B2 | 11/2013 | Lambourne et al. |
| 8,707,077 B2 | 4/2014 | Knowles |
| 8,930,006 B2 * | 1/2015 | Haatainen ............ H04J 3/0667 700/94 |
| 8,942,252 B2 | 1/2015 | Balassanian et al. |
| 9,195,258 B2 | 11/2015 | Millington |
| 9,213,357 B2 | 12/2015 | Millington |
| 2002/0031196 A1 | 3/2002 | Muller et al. |
| 2002/0067909 A1 | 6/2002 | Iivonen |
| 2002/0131398 A1 | 9/2002 | Taylor |
| 2003/0050989 A1 | 3/2003 | Marinescu et al. |
| 2004/0008661 A1 | 1/2004 | Myles et al. |
| 2004/0136375 A1 | 7/2004 | Koguchi |
| 2006/0013208 A1 | 1/2006 | Rietschel et al. |
| 2007/0142944 A1 | 6/2007 | Goldberg et al. |
| 2010/0115119 A1 | 5/2010 | Gallo et al. |
| 2011/0002429 A1 * | 1/2011 | Williams ............ H04J 3/0632 375/356 |
| 2015/0098576 A1 | 4/2015 | Sundaresan et al. |
| 2015/0215715 A1 * | 7/2015 | Sheen .................... H04R 27/00 381/77 |
| 2015/0271745 A1 | 9/2015 | Knowles |
| 2015/0271772 A1 | 9/2015 | Knowles |
| 2015/0326331 A1 | 11/2015 | Knowles |

FOREIGN PATENT DOCUMENTS

| | | |
|---|---|---|
| WO | 00/76272 A1 | 12/2000 |
| WO | 0108366 A1 | 2/2001 |
| WO | 03/058830 A1 | 7/2003 |

* cited by examiner

CLOCK SYNCHRONIZATION FOR AUDIO PLAYBACK DEVICES

BACKGROUND

This disclosure relates to clock synchronization for audio playback devices.

SUMMARY

All examples and features mentioned below can be combined in any technically possible way.

In one aspect, a method is provided for synchronizing clocks on a plurality of audio playback devices. The method includes receiving a broadcast/multicast acknowledgement packet from a synchronization agent at a first audio playback device of the plurality of audio playback devices. A first timestamp representing a time when the acknowledgement packet was received by the first audio playback device is recorded. A broadcast/multicast timestamp packet is received from a time server at the first audio playback device. The timestamp packet includes a second timestamp representing a time when the time server received the acknowledgement packet from the synchronization agent. A local clock time on the first audio playback device is updated based on the first timestamp and the second timestamp. The method enables clock synchronization among the plurality of audio playback devices for synchronized playback of streamed audio via the plurality of audio playback devices.

Implementations may include one of the following features, or any combination thereof.

In some implementations, the broadcast/multicast acknowledgement packet includes a Dynamic Host Configuration Protocol (DHCP) message.

In certain implementations, the broadcast/multicast timestamp packet includes a Dynamic Host Configuration Protocol (DHCP) message.

In some cases, the method includes sending a network broadcast/multicast excitement packet to excite the synchronization agent.

In certain cases, the excitement packet includes a DHCP discover packet.

In some examples, sending the network broadcast/multicast excitement packet includes sending a first network excitement packet from the first audio playback device.

In some implementations, a broadcast/multicast acknowledgement packet is received from a synchronization agent at a second audio playback device of the plurality of audio playback devices, and a third timestamp representing a time when the acknowledgement packet was received by the second audio playback device is recorded. The broadcast/multicast timestamp packet from the time server is received at the second audio playback device, and a local clock time on the second audio playback device is updated based on the third timestamp and the second timestamp such that local clock time on the second audio playback device is the same as the local clock time on the first audio playback device.

In another aspect, an audio system includes a time server, a synchronization agent, and a plurality of audio playback devices for providing synchronized playback of streamed audio. Each audio playback device of the plurality is configured to: receive a broadcast/multicast acknowledgement packet from a synchronization agent; record a first timestamp representing a time when the acknowledgement packet was received; and receive a broadcast/multicast timestamp packet from the time server, wherein the timestamp packet includes a second timestamp representing a time when the time server received the acknowledgement packet from the synchronization agent; and update a local clock time based on the first timestamp and the second timestamp, such that the local clock time corresponds to that of the other audio playback devices.

Implementations may include one of the above and/or below features, or any combination thereof.

In some implementations, each of the audio playback devices are further configured to send a network broadcast/multicast excitement packet via the network interface to excite the synchronization agent.

In certain implementations, the time server, the synchronization agent, and the plurality of audio playback devices are coupled via in a network using a logical bus topology in which network packets are presented to all of the network devices at substantially the same time.

In some cases, the network is selected from the group consisting of: an Ethernet network, a WiFi network, and combinations thereof.

In certain cases, the audio system also includes an audio server for distributing the streamed audio and control data to the plurality of audio playback device, wherein the control data includes an indication when to play the content of the streamed audio.

In some examples, one of the plurality of audio playback devices serves as the time server.

In certain examples, the synchronization agent includes a network access point (e.g., a network router).

According to another aspect, a non-transitory computer readable storage medium includes a set of instructions for execution by a processor. The set of instructions, when executed, causes the processor to: receive a broadcast/multicast acknowledgement packet via the network interface from a synchronization agent; record a first timestamp representing a time when the acknowledgement packet was received; receive a broadcast/multicast timestamp packet from a time server, wherein the timestamp packet includes a second timestamp representing a time when the time server received the acknowledgement packet from the synchronization agent; and update a local clock time based on the first timestamp and the second timestamp.

Implementations may include one of the above and/or below features, or any combination thereof.

In some implementations, the instructions further cause the processor to send a network broadcast/multicast excitement packet to excite a synchronization agent.

In yet another aspect, an audio playback device includes a digital-to-analog converter configured to receive an audio stream including a digital representation of audio content via a network and convert to analog form. The audio playback device also includes an electro-acoustic transducer; and a network interface. A processor is coupled to the digital-to-analog converter, the electro-acoustic transducer, and the network interface. The device also includes instructions stored on a non-transitory computer-readable media that, when executed, cause the processor to: receive a broadcast/multicast acknowledgement packet via the network interface from a synchronization agent; record a first timestamp representing a time when the acknowledgement packet was received by the playback device; receive a broadcast/multicast timestamp packet via the network interface from a time server, wherein the timestamp packet includes a second timestamp representing a time when the time server received the acknowledgement packet from the synchronization agent; and update a local clock time based on the first timestamp and the second timestamp, such that the local clock time corresponds to that of at least one other audio playback device on the network.

Implementations may include one of the above and/or below features, or any combination thereof.

In some implementations, the instructions further cause the processor to send a network broadcast/multicast excitement packet via the network interface to excite a synchronization agent.

DETAILED DESCRIPTION

An audio distribution system that has a number of audio playback devices can be configured such that to provide synchronized playback of stream audio content. When the audio playback devices are part of a network, the synchronization of the respective internal clocks of the individual audio playback devices can be based on a series of broadcast/multicast network communications between the audio playback devices, a time server, and a synchronization agent. Synchronization of the internal clocks of the audio playback devices helps to enable the synchronized playback of audio content; i.e., such that all playback devices control playback of the audio content according to the same time reference.

Figure 1:
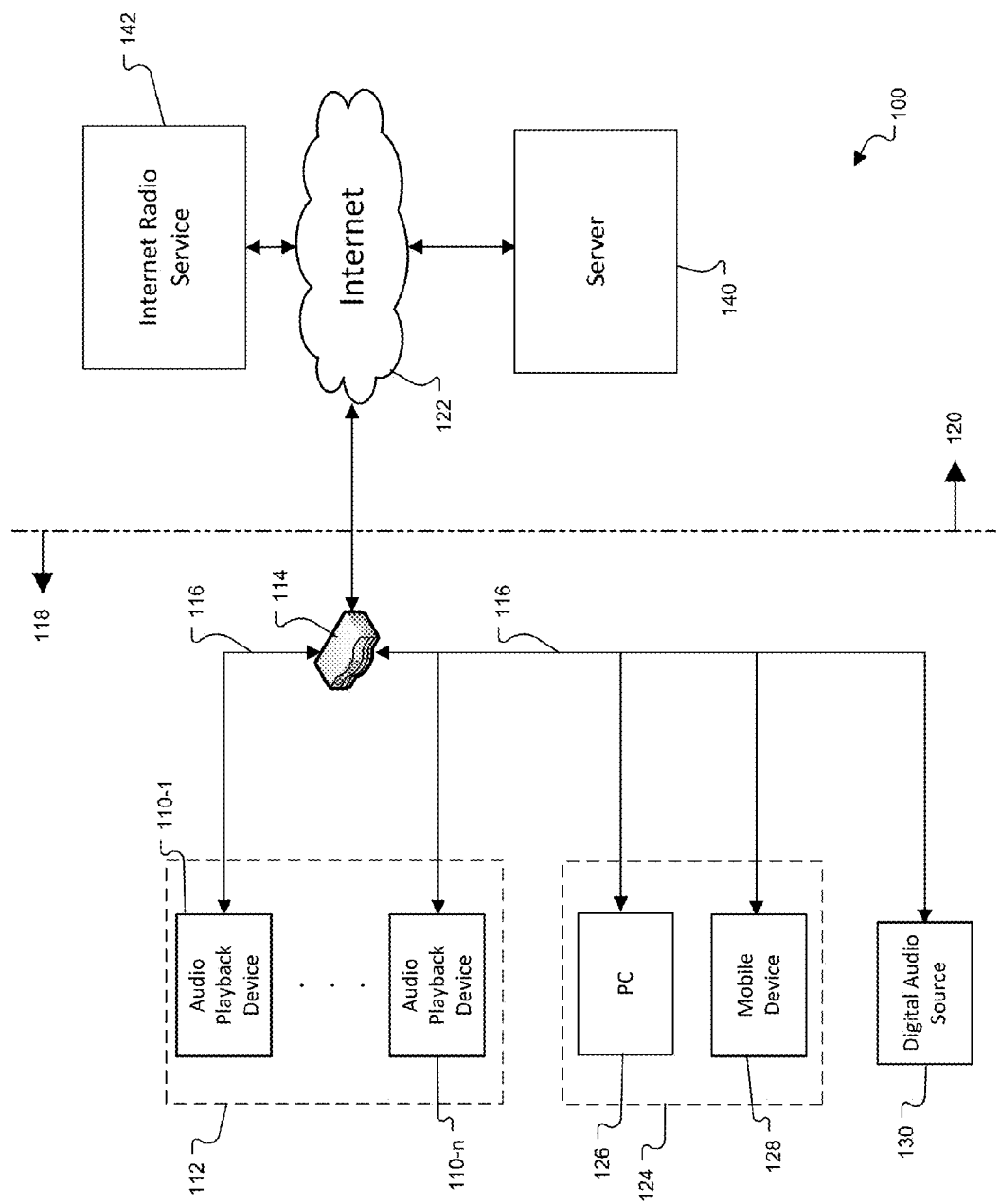
FIG. 1 is schematic block diagram of an audio distribution system.

Audio distribution system 100, FIG. 1, can be used to accomplish a method for distributing audio data to audio playback devices that are connected to a network, and also includes the computer devices that are involved in the subject audio distribution. System 100 is adapted to deliver digital audio (e.g., digital music). System 100 includes a number of audio playback devices 110-1-110-n (collectively referenced as 110), which are among the group of audio output devices 112 of the system. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to the router/access point 114 via network 116. The audio playback devices are thus able to communicate with one another. Network 116 can be a wired and/or wireless network, and can use known network connectivity methodologies. Network 116 is part of LAN 118 which is connected to wide area network (WAN) 120, in this non-limiting example by connection to Internet 122. LAN 118 also includes one or more separate computing devices 124 and one or more separate local digital audio sources 130. In this non-limiting example the computing devices include a personal computer 126 and a mobile computing device 128 such as a smart phone, tablet or the like. WAN 120 includes server 140 and Internet radio service 142 which can both communicate with the LAN via Internet 122.

One use of system 100 is to play an audio stream over one or more of the audio playback devices in group 112. The sources of digital audio provide access to content such as audio streams that move over network 116 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 130, and media server applications such as may be found on a mobile computing device, can also be sources of audio data. In a non-limiting example, the user selects the audio source and the playback devices via PC 126 and/or mobile device 128.

When a user has chosen to have an audio stream played on more than one of the audio playback devices, in order for the music to be properly synchronized such that the same tracks are playing synchronously on all of the audio playback devices there needs to be appropriate and sufficient coordination among all of the audio playback devices. One manner in which such coordination can be accomplished is to use one of the audio playback devices to control the distribution of audio data to all of the other audio playback devices that are being used to play content. This device which controls audio data distribution to the other active playback devices can be considered a master device, and the rest of the active devices (i.e., the rest of the playback devices that are being used to play content) can be considered to be slave devices. In addition to an audio stream, the master device also provides control data (e.g., via a control data stream) to the slave devices. The control data includes timing information which enables the slave devices to synchronize playback of the streamed audio content with the master device. In one example, the control data includes a "play at" time, which corresponds to a time when the playback devices are to begin playback of the streamed audio data. Devices joining the playback group after playback has started may also use the "play at" time to determine where in the stream to begin playback in order to sync up with the playback devices in the group.

Figure 2:
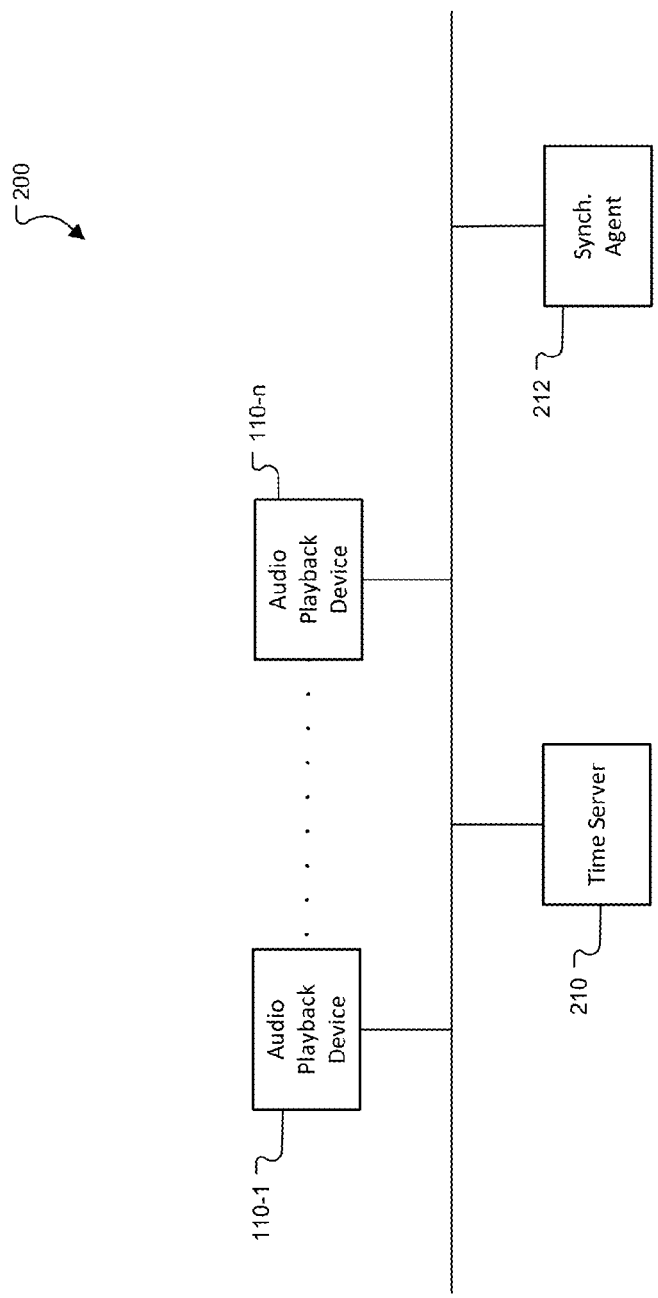
FIG. 2 is a logical bus topology from the audio distribution system of FIG. 1.

To help ensure that the playback of the audio content is and remains synchronized, the respective internal clocks of the individual playback devices are synchronized. In principle, such clocks comprise an oscillator and a counter. With reference to FIG. 2, this disclosure proposes a method to synchronize multiple devices to a single device, here denominated a time server 210 using an auxiliary device here denominated a synchronization agent 212. All of these devices, i.e., the time server, the synchronization agent, and the playback devices, are connected in a network (e.g., the network 116, FIG. 1) using a logical bus topology 200 as depicted in FIG. 2. The logical bus topology 200 may represent any network topology in which network packets are presented to all devices connected to it at the same time (+/−propagation delay). Ethernet and a WiFi channel are examples of such bus configurations.

The functionality of the time server 210 may be provided by one of the audio playback devices (110-1-110-n). For example, in some cases, the time server 210 may be the master device, or any one of the slave devices, in a synchronized group of audio playback devices 110. The functionality of the synchronization agent 212 may be provided by a network access point, such as router 114 (FIG. 1).

Figure 3:
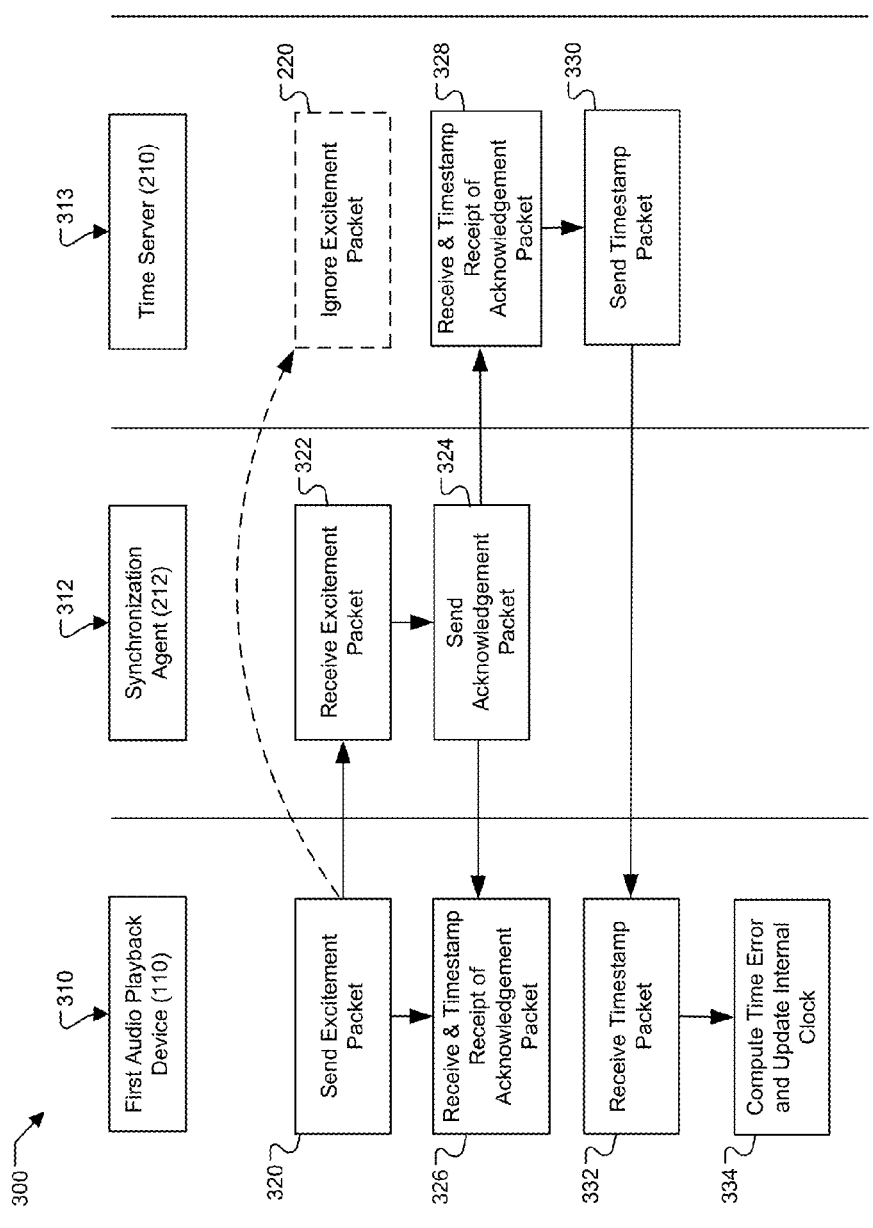
FIG. 3 is a swim lane diagram showing steps of synchronizing an audio playback device to a time server.

FIG. 3 is a swim lane diagram 300 showing steps of a method for synchronizing audio playback devices in a network. "Swim lane" diagrams may be used to show the relationship between the various "actors" in the processes and to define the steps involved in the processes. FIG. 3 may equally represent a high-level block diagram of components of the invention implementing the steps thereof. The steps of FIG. 3 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Referring to FIG. 3, three swim lanes are shown including a lane (310) for a representative one of the audio playback devices (110), a lane (312) for the synchronization agent 212, and a lane (314) for the time server 210. At step 320, the audio playback device seeking to synchronize to the time server sends a network broadcast or multicast (hereinafter "broadcast/multicast") packet to "excite" the synchronization agent. All of the other networked audio playback devices and the time server ignore this packet.

The synchronization agent receives the excitement packet (step 322), and replies (step 324) with a broadcast/multicast packet acknowledging the excitement packet. Since the acknowledgement packet is a broadcast/multicast packet, all devices in the network will receive it. Upon receiving the acknowledgement packet, all of the playback devices record (326) their timestamp (tack) when that event happened. Similarly, the time server also records (step 328) its timestamp (Tack) when it receives the acknowledgement packet. Next, as a response to the acknowledgement packet, the time server sends (step 330) another broadcast/multicast packet that contains the timestamp (Tack) when it received the acknowledgement packet from the synchronization agent.

Next, the audio playback devices receive (step 332) the timestamp packet from the time server, and, at step 334, each of the audio playback devices compute their respective time error using the following expression:

$$\text{Time Error} = T_{ack} - t_{ack}$$

This time error is used to adjust the individual device's respective internal clocks, such that the local clock time corresponds to that of the other audio playback devices.

An embodiment of this method can use Dynamic Host Configuration Protocol (DHCP) discover packets to excite the network DHCP server (here, the synchronization agent). If those packets are sent using the flag BROADCAST set, the DHCP server will reply to the discover request using a broadcast packet that can be used as the acknowledge packet. The results of this method have shown that synchronization between the time server and audio playback devices can be better than 30 microseconds, which is sufficient for audio applications.

Any new device seeking to join the group will perform the same steps to synchronize its clock to the time server.

Figure 4A:
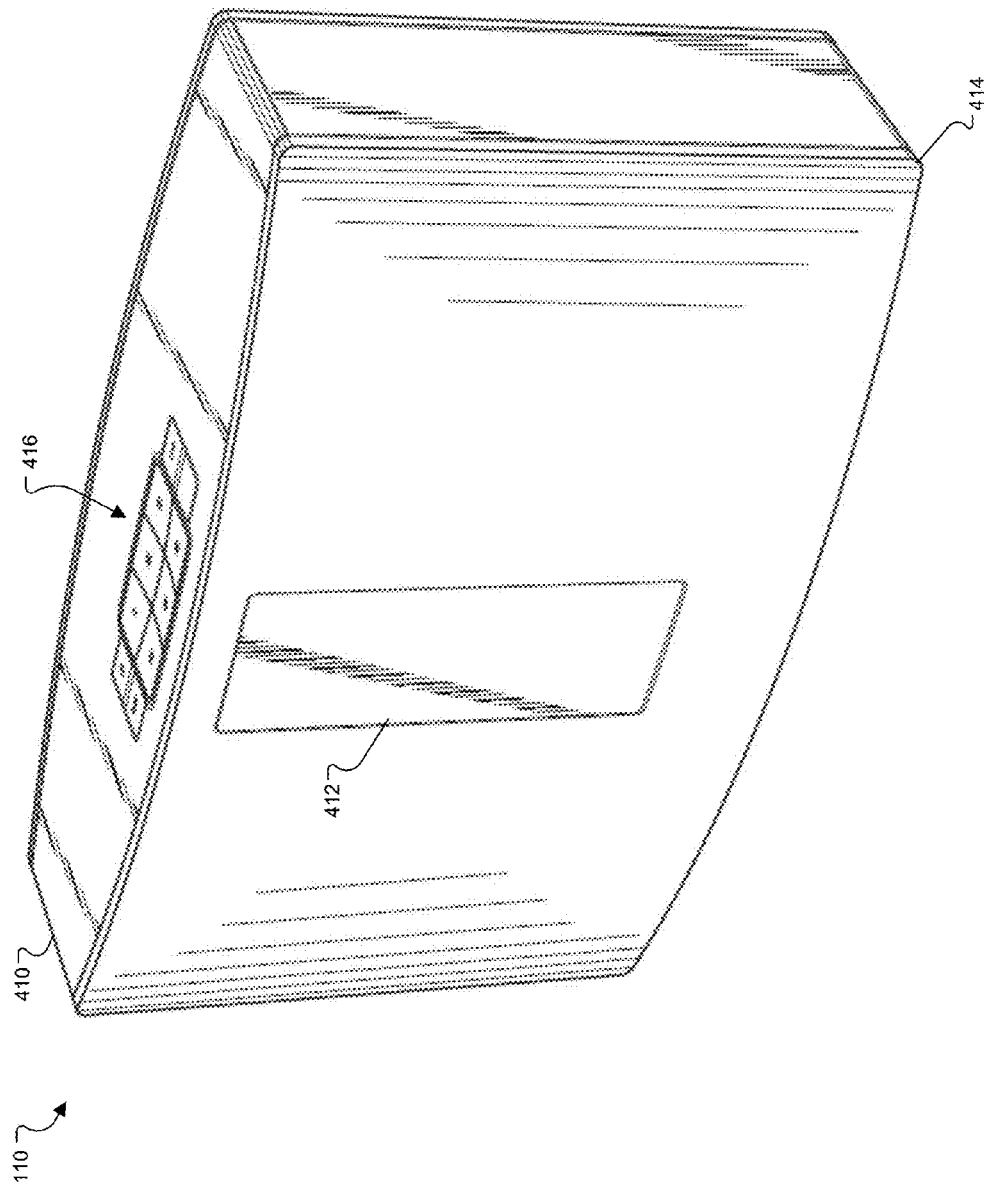
FIGS. 4A and 4B are perspective and top plan views, respectively, of an exemplary audio playback device from the audio system of FIG. 1.
Figure 4B:
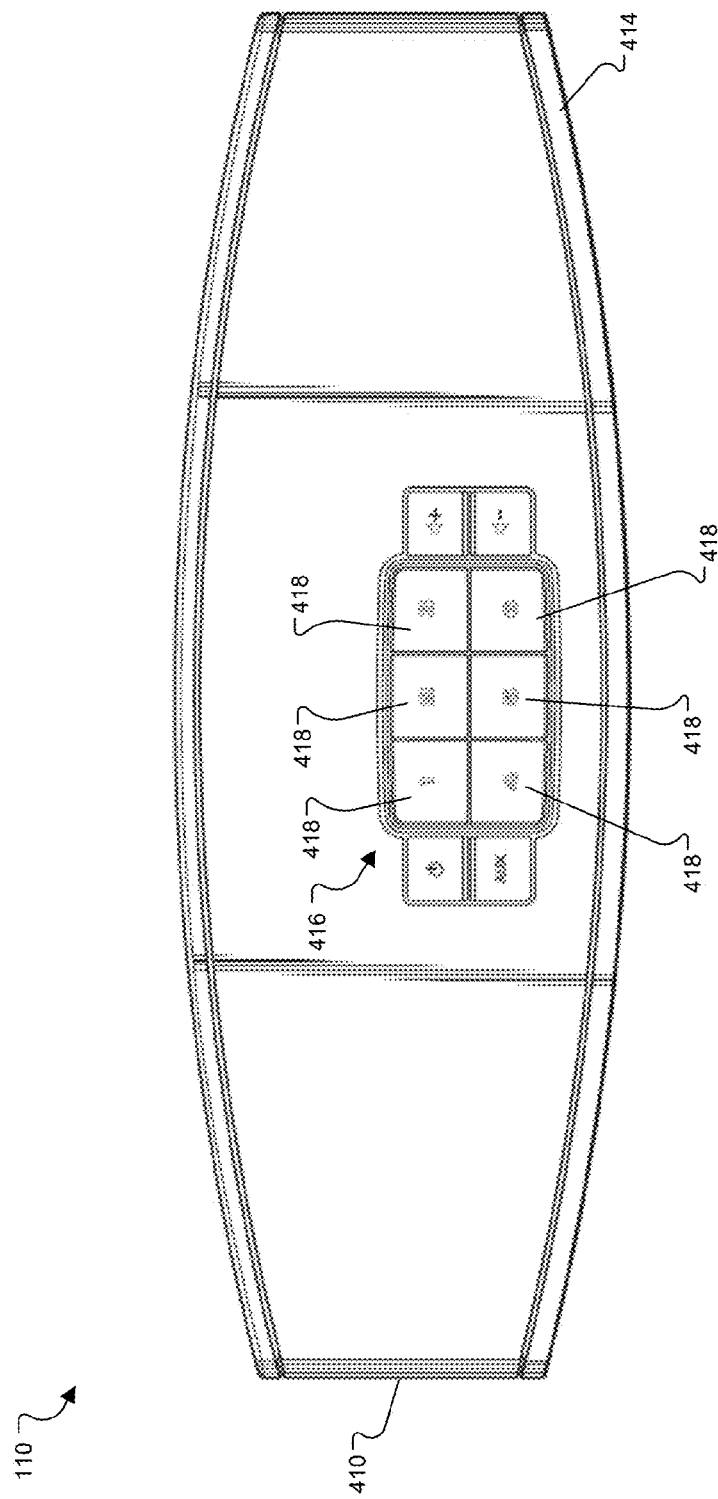
Figure 4C:
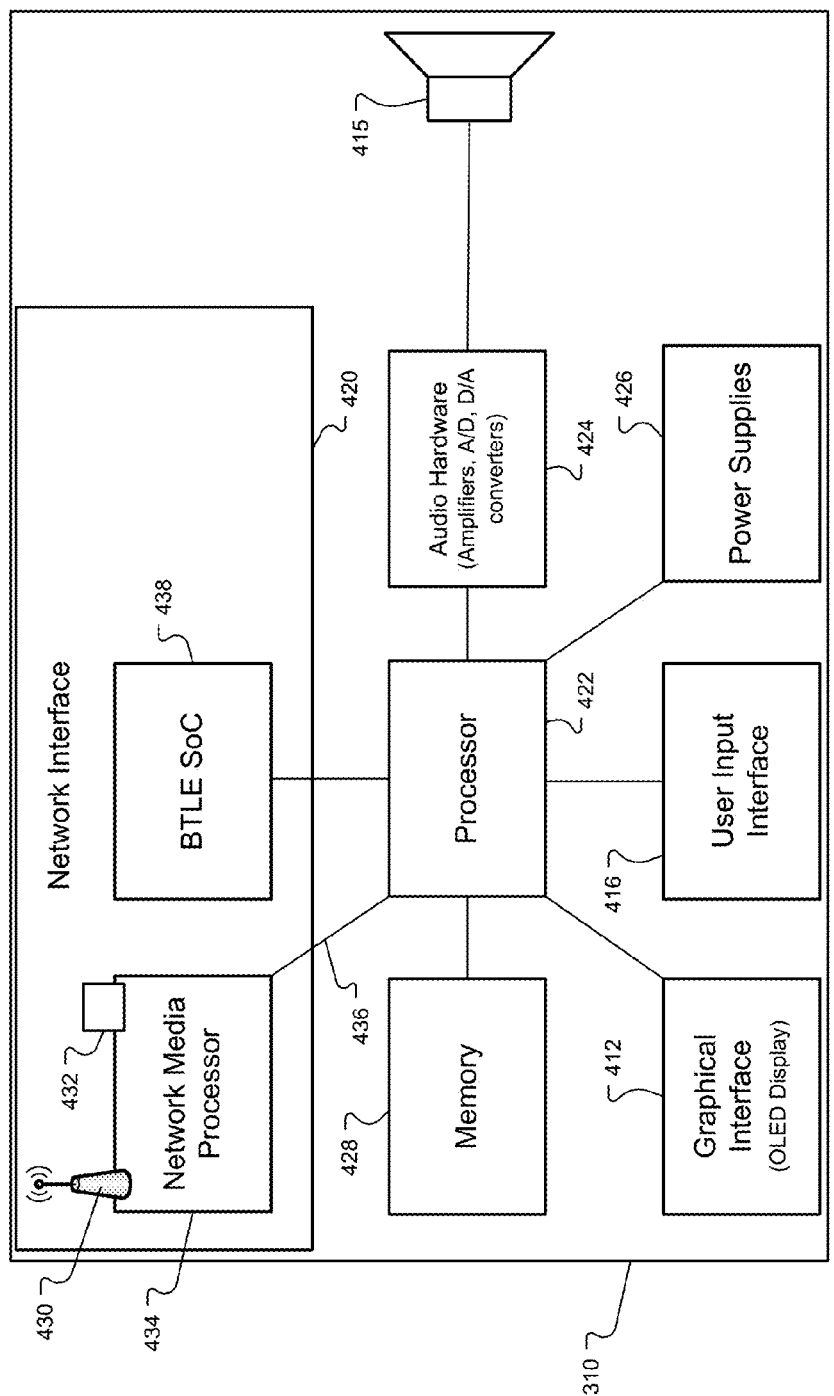
FIG. 4C is a block diagram of the audio playback device of FIG. 4A.

An exemplary audio playback device 110 will now be described in greater detail with reference to FIGS. 4A through 4C. Referring to FIG. 4A, an audio playback device 110 includes an enclosure 410 and on the enclosure 410 there resides a graphical interface 412 (e.g., an OLED display) which can provide the user with information regarding currently playing ("Now Playing") music and information regarding the presets. A screen 414 conceals one or more electro-acoustic transducers 415 (FIG. 4C). The audio playback device 110 also includes a user input interface 416. As shown in FIG. 4B, the user input interface 416 includes a plurality of preset indicators 418, which are hardware buttons in the illustrated example. The preset indicators 418 (numbered 1-6) provide the user with easy, one press access to entities assigned to those buttons. That is, a single press of a selected one of the preset indicators 418 will initiate streaming and rendering of content from the assigned entity.

The assigned entities can be associated with different ones of the digital audio sources such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 418 operate in the same manner, at least from a user's perspective, regardless of which entities are assigned and which of the digital audio sources provide the assigned entities. That is, each preset indicator 418 can provide for single press access to its assigned entity whether that entity is a user-defined playlist of digital music provided by an NAS device or an Internet radio station provided by an Internet music service.

With reference to FIG. 4C, the audio playback device 110 also includes a network interface 420, a processor 422, audio hardware 424, power supplies 426 for powering the various audio playback device components, and memory 428. Each of the processor 422, the graphical interface 412, the network interface 420, the processor 422, the audio hardware 424, the power supplies 426, and the memory 428 are interconnected using various buses, and several of the components may be mounted on a common motherboard or in other manners as appropriate.

The network interface 420 provides for communication between the audio playback device 110, the remote server (item 140, FIG. 1), the audio sources and other audio playback devices 110 via one or more communications protocols. The network interface 420 may provide either or both of a wireless interface 430 and a wired interface 432. The wireless interface 430 allows the audio playback device 110 to communicate wirelessly with other devices in accordance with a communication protocol such as such as IEEE 802.11 b/g. The wired interface 432 provides network interface functions via a wired (e.g., Ethernet) connection.

In some cases, the network interface 420 may also include a network media processor 434 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN 118, the user can then stream music to the network connected audio playback devices 110 via Apple AirPlay®. A suitable network media processor is the DM870 processor available from SMSC of Hauppauge, N.Y. The network media processor 434 provides network access (i.e., the Wi-Fi network and/or Ethernet connection can be provided through the network media processor 434) and AirPlay® audio. AirPlay® audio signals are passed to the processor 422, using the I2S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device.

All other digital audio coming from network packets comes straight from the network media processor 434 through a USB bridge 436 to the processor 422 and runs into the decoders, DSP, and eventually is played back (rendered) via the electro-acoustic transducer(s) 415.

The network interface 420 can also include a Bluetooth low energy (BTLE) system-on-chip (SoC) 438 for Bluetooth low energy applications (e.g., for wireless communication with a Bluetooth enabled controller (not shown). A suitable BTLE SoC is the CC2540 available from Texas Instruments, with headquarters in Dallas, Tex.

Streamed data pass from the network interface 420 to the processor 422. The processor 422 can execute instructions within the audio playback device (e.g., for performing, among other things, digital signal processing, decoding, and equalization functions), including instructions stored in the memory 428. The processor 422 may be implemented as a chipset of chips that include separate and multiple analog and digital processors. The processor 422 may provide, for example, for coordination of other components of the audio playback device 110, such as control of user interfaces, applications run by the audio playback device 110. A suitable processor is the DA921 available from Texas Instruments.

The processor 422 provides a processed digital audio signal to the audio hardware 424 which includes one or more digital-to-analog (D/A) converters for converting the digital audio signal to an analog audio signal. The audio hardware 424 also includes one or more amplifiers which provide amplified analog audio signals to the electroacoustic transducer(s) 415 for playback. In addition, the audio hardware 424 may include circuitry for processing analog input signals to provide digital audio signals for sharing with other devices in the acoustic system 100.

The memory 428 may include, for example, flash memory and/or non-volatile random access memory (NVRAM). In some implementations, instructions (e.g., software) are stored in memory 428. The instructions, when executed by one or more processing devices (e.g., the processor 422), perform one or more processes, such as those described above (e.g., with respect to FIG. 3). The instructions can also be stored by one or more storage devices, such as one or more computer- or machine-readable mediums (for example, the memory 428, or memory on the processor). The instructions may include instructions for performing decoding (i.e., the software modules include the audio codecs for decoding the digital audio streams), as well as digital signal processing and equalization.

A number of implementations have been described. Nevertheless, it will be understood that additional modifications may be made without departing from the scope of the inventive concepts described herein, and, accordingly, other implementations are within the scope of the following claims.

For example, the concepts described above work not only with dedicated speaker packages, such as illustrated in FIGS. 4A-4C, but also with computers, mobile devices, etc.

What is claimed is:

1. A method for synchronizing clocks on a plurality of audio playback devices, the method comprising:
    receiving a broadcast/multicast acknowledgement packet from a synchronization agent at a first audio playback device of the plurality of audio playback devices;
    receiving the broadcast/multicast acknowledgement packet at a time server;
    recording a first timestamp representing a time when the acknowledgement packet was received by the first audio playback device;
    receiving a broadcast/multicast timestamp packet from the time server at the first audio playback device, wherein the timestamp packet includes a second timestamp representing a time when the time server received the acknowledgement packet from the synchronization agent; and
    updating a local clock time on the first audio playback device based on the first timestamp and the second timestamp,
    wherein the method enables clock synchronization among the plurality of audio playback devices for synchronized playback of audio content via the plurality of audio playback devices, and
    wherein the synchronization agent and the time server are separate and discrete devices that are configured to communicate over a local area network.

2. The method of claim 1, wherein the broadcast/multicast acknowledgement packet comprises a Dynamic Host Configuration Protocol (DHCP) message.

3. The method of claim 1, wherein the broadcast/multicast timestamp packet comprises a Dynamic Host Configuration Protocol (DHCP) message.

4. The method of claim 1, further comprising sending a network broadcast/multicast excitement packet to excite the synchronization agent.

5. The method of claim 4, wherein the excitement packet comprises a DHCP discover packet.

6. The method of claim 4, wherein sending the network broadcast/multicast excitement packet comprises sending a first network excitement packet from the first audio playback device.

7. The method of claim 1, further comprising receiving a broadcast/multicast acknowledgement packet from a synchronization agent at a second audio playback device of the plurality of audio playback devices;
    recording a third timestamp representing a time when the acknowledgement packet was received by the second audio playback device;
    receiving the broadcast/multicast timestamp packet from the time server at the second audio playback device; and
    updating a local clock time on the second audio playback device based on the third timestamp and the second timestamp such that local clock time on the second audio playback device is the same as the local clock time on the first audio playback device.

8. An audio system comprising:
    a time server;
    a synchronization agent; and
    a plurality of audio playback devices for providing synchronized playback of audio content, wherein each audio playback device of the plurality is configured to:
    receive a broadcast/multicast acknowledgement packet from a synchronization agent;
    record a first timestamp representing a time when the acknowledgement packet was received;
    receive a broadcast/multicast timestamp packet from the time server, wherein the timestamp packet includes a second timestamp representing a time when the time server received the acknowledgement packet from the synchronization agent;

update a local clock time based on the first timestamp and the second timestamp, such that the local clock time corresponds to that of the other audio playback devices; and using the updated local clock time to render the audio content in synchrony with the other audio playback devices.

9. The audio system of claim 8, wherein each of the audio playback devices is further configured to send a network broadcast/multicast excitement packet via the network interface to excite the synchronization agent.

10. The audio system of claim 8, wherein the time server, the synchronization agent, and the plurality of audio playback devices are coupled via in a network using a logical bus topology in which network packets are presented to all of the network devices at substantially the same time.

11. The audio system of claim 10, wherein the network is selected from the group consisting of: an Ethernet network, a WiFi network, and combinations thereof.

12. The audio system of claim 8, further comprising an audio server for distributing the audio content and control data to the plurality of audio playback device, wherein the control data includes an indication when to play the audio content.

13. The audio system of claim 8, wherein one of the plurality of audio playback devices serves as the time server.

14. The audio system of claim 8, wherein the synchronization agent comprises a network access point.

15. The audio system of claim 14, wherein the synchronization agent comprises a network router.

16. A non-transitory computer readable storage medium including a set of instructions for execution by a processor, the set of instructions, when executed, causes the processor to:
receive a broadcast/multicast acknowledgement packet via the network interface from a synchronization agent;
record a first timestamp representing a time when the acknowledgement packet was received;
receive a broadcast/multicast timestamp packet from a time server, wherein the timestamp packet includes a second timestamp representing a time when the time server received the acknowledgement packet from the synchronization agent;
update a local clock time based on the first timestamp and the second timestamp; and
using the updated local clock time to enable synchronized playback of the audio content among a plurality of audio playback devices.

17. The non-transitory computer readable storage medium of claim 16, wherein the instructions further cause the processor to send a network broadcast/multicast excitement packet to excite a synchronization agent.

18. An audio playback device comprising:
a digital-to-analog converter configured to receive an audio stream comprising a digital representation of audio content via a network and convert to analog form;
an electro-acoustic transducer;
a network interface;
a processor coupled to the digital-to-analog converter, the electro-acoustic transducer, and the network interface; and
instructions stored on a non-transitory computer-readable media that, when executed, cause the processor to:
receive a broadcast/multicast acknowledgement packet via the network interface from a synchronization agent;
record a first timestamp representing a time when the acknowledgement packet was received by the playback device;
receive a broadcast/multicast timestamp packet via the network interface from a time server, wherein the timestamp packet includes a second timestamp representing a time when the time server received the acknowledgement packet from the synchronization agent;
update a local clock time based on the first timestamp and the second timestamp, such that the local clock time corresponds to that of at least one other audio playback device on the network; and
using the updated local clock time to render the audio content in synchrony with the at least one other audio playback devices.

19. The audio playback device of claim 18, wherein the instructions further cause the processor to send a network broadcast/multicast excitement packet via the network interface to excite a synchronization agent.

* * * * *